(12) United States Patent
Dang et al.

(10) Patent No.: US 6,304,542 B1
(45) Date of Patent: Oct. 16, 2001

(54) COMPACT DUAL WAVELENGTH OPTICAL PICKUP HEAD

(75) Inventors: Lieu-Kim Dang, Villingen-Schwenningen; Christoph Dietrich; Hartmut Richter, both of Villingen; Heinz-Joerg Schroeder, Villingen-Schwenningen, all of (DE)

(73) Assignee: Deutsche Thomson-Brandt GmbH, Villingen-Schwennigen (DE)

( * ) Notice: Subject to any disclaimer, the term of this patent is extended or adjusted under 35 U.S.C. 154(b) by 0 days.

(21) Appl. No.: 09/173,961

(22) Filed: Oct. 16, 1998

(30) Foreign Application Priority Data

Oct. 27, 1997 (EP) .................................................. 97402539

(51) Int. Cl.$^7$ ....................................................... G11B 7/00
(52) U.S. Cl. ................................... 369/112.23; 369/112.1
(58) Field of Search ........................ 369/112.01, 112.03, 369/112.05, 112.1, 112.15, 112.28, 112.29, 112.14, 53.22, 53.23, 94, 112.23, 112.25, 112.26, 120

(56) References Cited

U.S. PATENT DOCUMENTS 5,513,164   4/1996   Tanaka et al. .
5,703,856   12/1997  Hayashi et al. .

FOREIGN PATENT DOCUMENTS

| 0742554 A2 | 11/1996 | (EP) . |
| 0747893 A2 | 12/1996 | (EP) . |
| 08 227534 | 9/1996 | (JP) . |
| 09 007206 | 1/1997 | (JP) . |
| 09 044885 | 2/1997 | (JP) . |

OTHER PUBLICATIONS

\* Patent Abstracts of Japan, vol. 097, No. 001, Jan. 31, 1997, (Mitsubishi Electric Corp.).
R. Katayama, Y. Komatsu, and Y. Ono, "Dual Wavelength Optical Head for 0.6mm and 1.2mm Substrate Thicknesses", Jpn. J. Appl. Phys., vol. 36 (1997) Pt. 1, No. 1B, pp. 460–466.
EPO Search Report dated: Apr. 1, 1998.

Primary Examiner—Paul W. Huber
(74) Attorney, Agent, or Firm—J. S. Tripoli; F. A. Wein

(57) ABSTRACT

A dual wavelength optical pickup head in which as many same parts as possible are used as well to direct light beams incident than light beams reflected from a reflective layer of an optical disk. The reuse of as many parts as possible allows to and a second wavelength emitted by a first and a second light source to an optical disk, a dual focus lens objective for focusing said light beams on a layer of said optical disk and a single detector which allows to detect light beams of either said first or said second wavelength.

10 Claims, 2 Drawing Sheets

COMPACT DUAL WAVELENGTH OPTICAL PICKUP HEAD

CROSS REFERENCE TO RELATED APPLICATIONS

This application claims priority of EPO Appln. 97402539.7 of Oct. 27, 1997.

FIELD OF THE INVENTION

Cross Reference to Related Application

The present invention relates to a dual wavelength optical pickup head which may be used in an optical disk reading and/or writing device.

BACKGROUND OF THE INVENTION

The dual wavelength optical pickup head allows to use light of different wavelengths in order to process disks of different thickness and/or different reflectivity of a reflecting layer. The dual wavelength optical pickup head may be used in most recent optical disk reading and/or writing devices, e.g. in DVD-ROM reading devices, in order to preserve a backward compatibility with older optical disk formats, e.g. a CD-R disk format. At least two characteristics of disks have to be taken into account to preserve the backward compatibility, namely a thickness and a reflectivity of the disks. DVD optical disks use a 0.6 mm thick substrate and may be read out using light with a wavelength of about 650 nm. CD-R optical disks use a substrate as thick as 1.2 mm and may be read out using light with a wavelength of about 780 nm. The CD-R optical disk has the drawback that it may not be read using light with a wavelength of about 650 nm because a special dye recovering its surface absorbs light of the latter wavelength.

A publication *Dual Wavelength optical Head for 0.6 mm and 1.2 mm Substrate Thicknesses*, R. Katayama, Y. Komatzu and Y. Ono, Jpn. J. Appl. Phys. Vol. 36 (1997) pp. 460–466, Part 1, No. 1B, January 1997, discloses an optical head which uses either holographic optical element type optics or variable magnification type optics. The optical head may be used with 0.6 and 1.2 mm substrate thicknesses and contains 635 nm and 785 nm laser diodes. The optical head comprises a single polarizing beam splitter and a set of signal detection optics for each 635 nm and 785 nm light beam.

Consumer product industries strive to reduce the size of their products in order to make them portable and cheaper. These efforts impose a miniaturization and/or a reduction of the number of parts in components making up the products. This would apply e.g. to the optical head of a portable and/or cheaper optical disk reading and/or writing device. On the other hand small components should be just as reliable as their more voluminous equivalents.

One aim of the present invention is to find a solution to reduce the size of an optical head without increasing its cost.

SUMMARY OF THE INVENTION

The present invention provides a dual wavelength optical pickup head for use in an optical disk writing and/or reading device which comprises at least optical means for directing light beams of a first and a second wavelength emitted by a first and a second light source to an optical disk. The optical means comprise at least a wavelength selective beam splitter which allows to at least partially change the direction of a light beam of the first wavelength and is transmissive for a light beam of the second wavelength. The optical pickup head further comprises focusing means for focusing the light beams on a layer of the optical disk, photodetection means for detecting with a single detector light of each one of the first or the second wavelength reflected by the layer of the optical disk, and further optical means for directing a reflected light beam reflected by the layer to the photodetection means.

DESCRIPTION OF THE PREFERRED EMBODIMENTS

Figure 1:
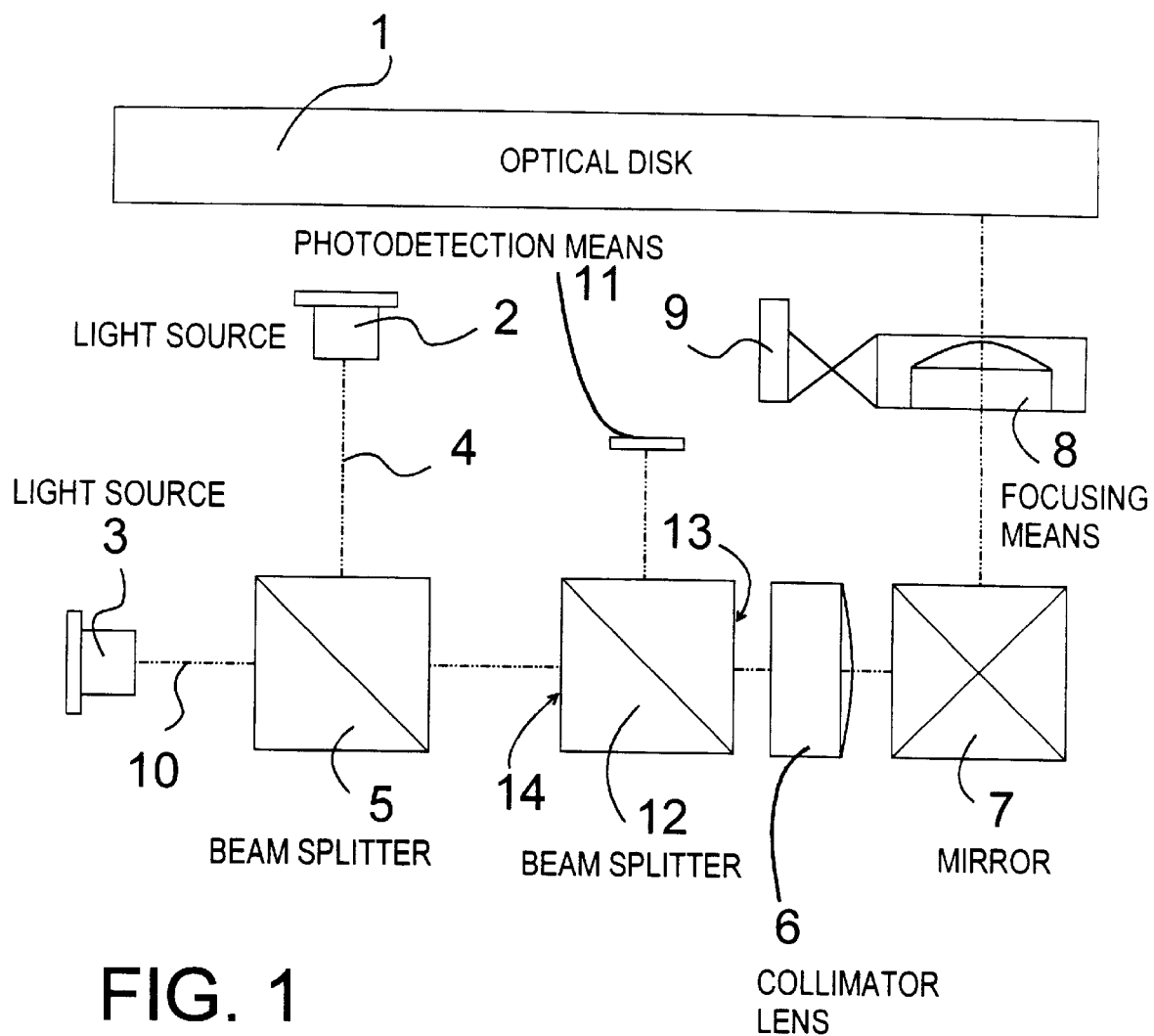
FIG. 1 contains a schematic representation of a first embodiment according to the invention, FIG. 2 contains a schematic representation of a second embodiment according to the invention.
Figure 2:
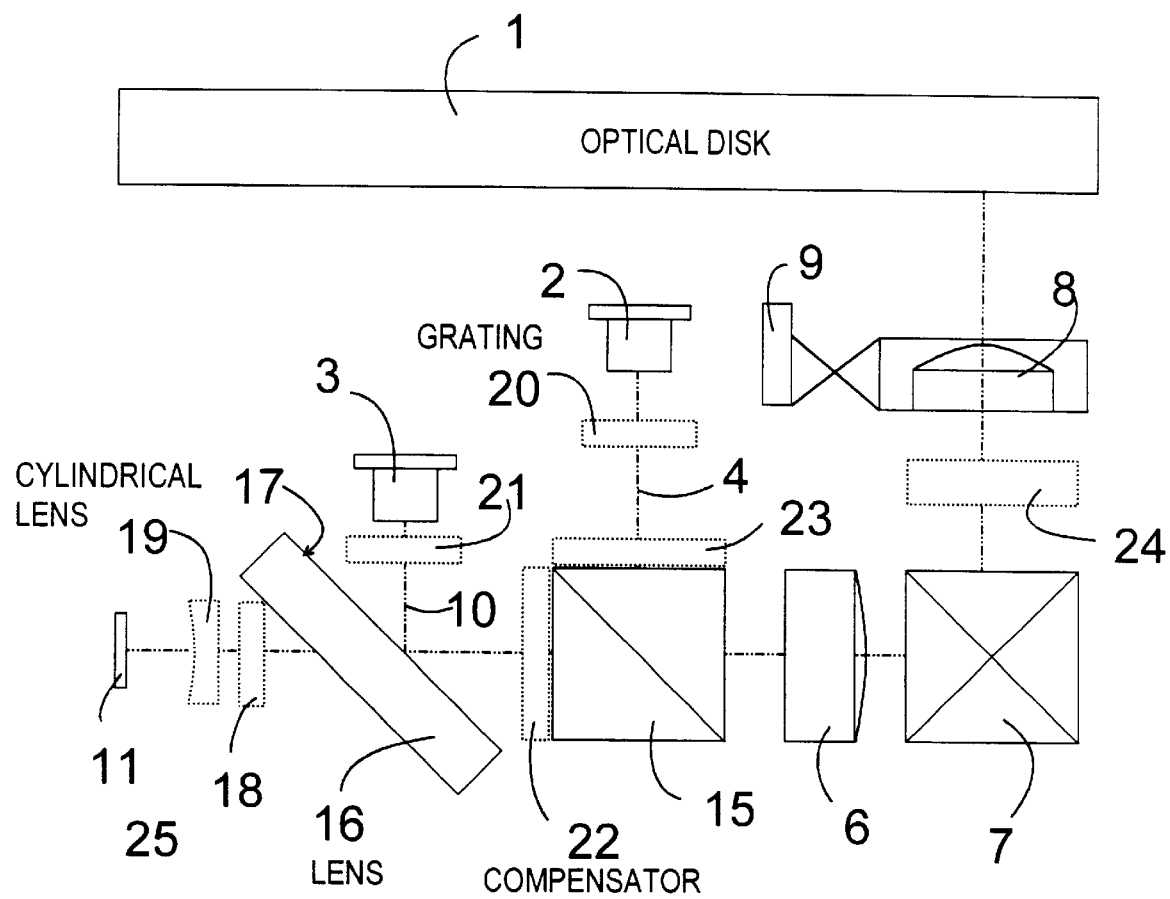

All along the following description same numbers will be used to reference same parts which appear in both FIG. 1 and 2.

FIG. 1 schematically shows some parts of a dual wavelength optical pickup head which is designed for use in an optical disk writing and/or reading device (not shown). The optical pickup head may be used to write and/or read on an optical and/or magneto-optical medium 1 using light with a first wavelength and/or a second wavelength which is emitted respectively from a first light source 2 and a second light source 3. Preferably the light sources 2 and 3 are laser diodes. The first and second wavelengths may for example be around 650 nm and 780 nm. It is understood here that shorter wavelengths may be considered in the scope of the invention.

A first light beam 4 emitted by the first light source 2 is directed to the medium 1 by optical means. These optical means comprise a beam splitter 5 which reflects the first light beam 4, a collimator lens 6, a mirror 7 and an objective 8. Typically the objective 8 is actuated by an actuator 9 controlled by a focus control circuit (not shown) such as to keep a light spot (not shown) focused on a reflecting layer (not shown) of the medium 1. Said reflecting layer contains information.

A second light beam 10 emitted by the second light source 3 is also directed to the medium 1 by the optical means. The beam splitter 5 is used as a beam coupler for the second light beam 10 to direct the latter to the collimator 6.

The objective 8 may be optimized for use with light emitted by the first light source 2 and for a determined thickness of the medium 1. In this case some compensation optics (not shown) may be required for light emitted by the second light source 3.

Preferably the objective 8 is a dual focus lens objective.

The first light beam 4 and the second light beam 10 are typically used to read and/or write a first and a second kind of information respectively. Said first and second kind of information may be located on the same layer or on two layers of different level of thickness on the medium 1. Said first and said second kind of information may also be contained on a layer in a first medium and on a layer in a second medium respectively. It is understood that only one medium at the time can be read i.e. either the first medium or the second medium. The first medium has its layer at a different level of thickness than the layer in the second medium. The dual focus lens objective allows to take these levels of thicknesses into account such that a light spot obtained with the dual focus lens objective is focused on a reflecting layer of the medium. The dual focus lens objective allows to overcome a problem of compensation for spherical aberration due to different substrate thicknesses of different optical disks.

The first light beam 4 and/or the second light beam 10 are reflected from a reflective layer of the medium 1 and the reflected beams are directed on photodetection means 11 by further optical means. The further optical means have the objective 8, the mirror 7 and the collimator 6 in common with the optical means. In addition the further optical means comprise decoupling means 12 to redirect the reflected beams towards the photodetection means 11. The decoupling means 12 may for example be realized using a beam splitter which is designed to reflect at least partially the reflected beams entering on a surface 13 and to transmit the first light beam 4 and the second light beam 10 entering on a surface 14.

The photodetection means 11 typically comprise a photodetector (not shown). Depending on determined geometrical characteristics of the reflected light beam(s) the photodetector may have one or a plurality of detection elements as it is well known from a man skilled in the art.

The dual wavelength optical pickup head as shown in FIG. 1 is designed such that most of its parts making up the optical and the further optical means are used by the emitted and reflected light beams of both wavelengths. This keeps the number of component parts as low as possible and allows to reduce dimensions of the optical pickup head at a minimum value as compared to known prior art where more components parts are required, e.g. when two separate sets of detection optics for each wavelength are required. Furthermore the parts used are of widespread use in the optical pickup head industry which allows to keep a price of the optical pickup head at a low level.

FIG. 2 contains a schematic representation of a second embodiment of the optical pickup head. The optical means comprise a beam splitter 15 designed to partially reflect the first light beam 4 in order to direct the latter to the collimator lens 6. The optical means also comprise a plate 16 which partially reflects the second light beam 10 entering on its surface 17, to direct it to the collimator lens 6 via the beam splitter 15. The beam splitter 15 has a relatively high degree of transmissivity for light of the second light beam 10. A layer of the medium 1 reflects the first light beam 4 and/or the second light beam 10 and the reflected light beams are directed to photodetection means 11 via the objective 8, the mirror 7, the collimator lens 6, the beam splitter 15 and the plate 16 which make up the further optical means. Thus the further optical means have many parts in common with the optical means. This structure inside the optical pickup head allows to reduce dimensions of the optical pickup head at a minimum value as is the case for the one showed in FIG. 1

The plate 16 is positioned in an inclined manner such that the reflected light beam(s) passing through it becomes astigmatic, and doesn't affect the compactness of the optical pickup head. This property of the astigmatic reflected beam may be used to perform focus control, i.e. to monitor the focus of the light spot on the reflective layer of the medium 1. This is well known from a man skilled in the art and described in known prior art. Typically the photodetection means 11 will have four detection elements which form four quadrants and allow to determine a focus position of the light beam based on the shape of an ellipse formed by the reflected beam(s) on the photodetection means 11.

An optional projecting means comprising a lens 18 and/or a cylindrical lens 19 may be added to the further optical means as shown using dotted lines in FIG. 2 between the plate 16 and the photodetection means 11. The optional projecting means allow to improve a quality of projection of the reflected beam(s) on the photodetection means 11. The lens 18 is used for example to modify the astigmatic effect in the astigmatic reflected beam and to adapt a size of the projection such that it better matches a surface of the detector elements. The cylindrical lens 19 is used to adjust the astigmatic effect in the reflected beam. The cylindrical lens 19 may be used as an alternative means to render the reflected beam passing through it astigmatic and the plate 16 may then be replaced by a simple beam splitter (not shown).

Optionally the optical means may comprise diffraction means which split the first light beam 4 and/or the second light beam 10 in a central 0-order and in two 1st-order beams. The diffraction means may for example be realized using gratings 20 and/or 21 shown using dotted lines in FIG. 2 which are placed in the first light beam 4 and the second light beam 10, and compensators 22 and/or 23 respectively for gratings 20 and/or 21 also shown using dotted lines. The thus obtained 1st order beams may be used to perform tracking using for example the 3 beam tracking method well known by a man skilled in the art.

In a preferred option the diffraction means are realized using a hologram instead of the gratings 20 and/or 21.

Also optionally the optical means may comprise polarizing plane rotating means 24 to rotate a direction of polarization of said light beams. These polarizing plane rotating means may for example be realized using a quarterwave plate. This feature is particularly useful to avoid that reflected light beams reach the light sources 2 and/or 3. This feature is particularly useful in optical pickup heads designed specially for writing.

The parts making up the embodiments of the optical pickup heads shown in FIGS. 1 and 2 are geometrically positioned relatively to each other such that an optical axis of the objective 8, the first light beam 4, the second light beam 10 and the reflected light beam(s) are comprised in a single plane. However variations of the geometrical position of the parts making up the optical head relatively to each other in space may be performed by a man skilled in the art and remain in the scope of the present invention. One example for such a variation would be to rotate in FIG. 2 the objective 8, the actuator 9 and the mirror 7 by 90 degrees around an optical axis 25 going through the photodetection means 11 and the plate 16. Another example for such a variation would be to rotate the first light source 2 and the beam splitter 15 around said optical axis 25.

What is claimed is:

1. Dual wavelength optical pickup head for use in an optical disk writing and/or reading device comprising:

optical means for directing light beams of a first and a second wavelength emitted by a first and a second light source to an optical disk, the optical means comprising at least a wavelength selective beam splitter which allows to at least partially change the direction of a light beam of the first wavelength and is transmissive for a light beam of the second wavelength;

focusing means for focusing the light beams on a layer of the optical disk;

photodetection means for detecting with a single detector light of each one of the first or the second wavelength reflected by the layer of the optical disk;

further optical means for directing a reflected light beam reflected by the layer to the photodetection means; and wherein said focusing means comprises a dual focus lens objective.

2. Dual wavelength optical pickup head according to claim 1, wherein the single detector has a plurality of detection elements.

3. Dual wavelength optical pickup head according to claim 2, wherein the further optical means comprise a plate which allows to partially change a direction of a light beam of the second wavelength, is transmissive for a light beam of the first wavelength and is positioned such to render astigmatic the reflected light beam reaching the photodetection means.

4. Dual wavelength optical pickup head according to claim 3, wherein the further optical means comprise projecting means to project the reflected light beam on the plurality of detection elements of the single detector.

5. Dual wavelength optical pickup head according to claim 4, wherein the optical means comprise diffraction means for creating diffraction in either one of the light beams of the first or the second wavelength.

6. Dual wavelength optical pickup head according to claim 5, wherein the diffraction means comprise a grating.

7. Dual wavelength optical pickup head according to claim 5, wherein the diffraction means comprise a hologram.

8. Dual wavelength optical pickup head according to claim 1, wherein the optical means comprise polarizing plane rotating means to rotate a direction of polarization of the light beams.

9. Dual wavelength optical pickup head according to claim 8, wherein the polarizing plane rotating means comprise a quaterwave plate.

10. Dual wavelength optical pickup head according to claim 1, wherein the light beams of the first and the second wavelength remain in a plane which contains an optical axis of the focusing means.

* * * * *